(No Model.)
H. GUELS.
CAR WHEEL.
No. 481,862. Patented Aug. 30, 1892.
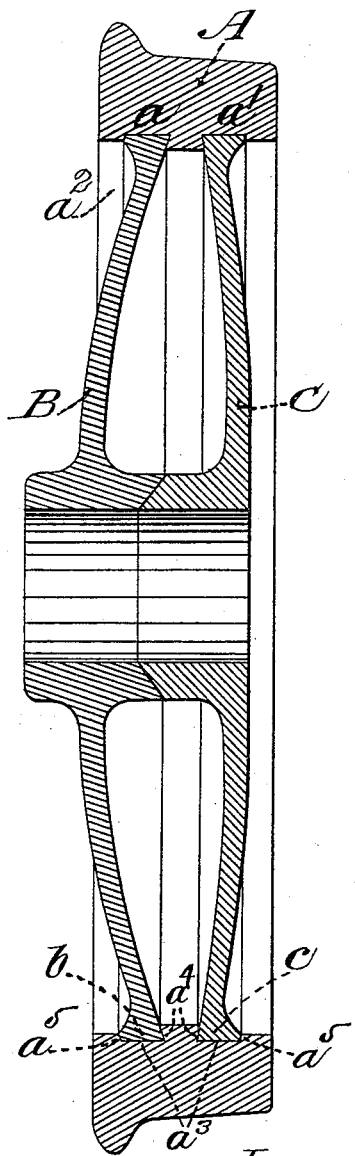
WITNESSES
Edward W. Furrell
A. Bonville
INVENTOR
Herman Guels
by C. D. Moody
his atty

UNITED STATES PATENT OFFICE.

HERMAN GUELS, OF ST. LOUIS, MISSOURI.

CAR-WHEEL.

SPECIFICATION forming part of Letters Patent No. 481,862, dated August 30, 1892.

Application filed September 19, 1891. Serial No. 406,202. (No model.)

*To all whom it may concern:*

Be it known that I, HERMAN GUELS, of St. Louis, Missouri, have made a new and useful Improvement in Car-Wheels, of which the following is a full, clear, and exact description.

The improvement relates to that class of car-wheels in which the tire and the central portion of the wheel are made separately and then united in the wheel; and it consists, mainly, in the special mode of constructing and uniting the tire and the adjoining part of the central portion of the wheel, substantially as is hereinafter described and claimed, aided by the annexed drawing, making part of this specification and showing the improved wheel in central section.

A represents the wheel-tire. The central portion of the wheel is composed of the two sides B and C. The tire and sides are united by inserting the sides at the periphery thereof in notches $a$ and $a'$, formed in the inner face $a^2$ of the tire. The special shape of said notches is a feature of the improvement. The inner or bottom line $a^3$ of each notch is parallel with the central axis of the wheel. The inner side $a^4$ of each notch is inclined outwardly, substantially as shown. The outer side $a^5$ of each notch is preferably inclined from the bottom $a^3$ slightly outward, substantially as shown. The construction is such as to cause the inner side $a^4$ of each notch to be, preferably, somewhat longer than the outer side $a^5$, substantially as shown. Both the inner walls or sides $a^4$ and the outer walls $a^5$ of the circumferential notches or grooves $a$ $a'$ extend approximately radially of the wheel and parallel with each other, and they are inclined outwardly, so as to tend to crowd the side pieces B and C securely in place when the tire is shrunk onto them. The peripheral portion—that is, the portion $b$ of the side B and the portion $c$ of the side C—of the side is fitted to its notch. This mode of constructing and combining the tire and sides enables, in the first place, the sides to be squarely sustained on the tire; second, the sides and tire are interlocked in a radial direction; third, the sides are confined laterally in both directions, and, fourth, the parts when joined have a perfect bearing upon each other, for in practice the tire is shrunk onto the sides, and, as it contracts readily onto the sides, it draws them respectively inward against the inner sides $a^4$ of the notches, and the tire also in contracting in a lateral direction comes to a bearing against the outer side of the tire parts $b$ $c$. A more perfect fit in this last-mentioned respect is obtained by giving the described bevel to the outer sides $a^5$ $a^5$ of the tire-notches. It may also be said that the described construction is desirable, in that it enables the finishing of the wheel at those points thereof at which the sides are joined to be economically done as compared with the cost of analogous constructions. The weight of the tire is also materially reduced and its cost thereby cheapened. The central portion of the wheel may be of any suitable form. The preferred construction is shown. In uniting the sides and tire the tire is not only shrunk onto the sides, but the sides are driven on the wheel-axle (not shown) and closed together laterally, and all so that the wheel when completed appears substantially as is represented in the drawing.

I claim—

1. The combination of the tire and the sides, said tire having the two circumferential grooves $a$ $a'$ formed with the outer engaging walls $a^5$ extending in an approximately radial direction and inclined slightly outward from the center of the tire and said sides being shaped at their peripheral portions so as to fit onto and engage said notches, substantially as described.

2. A car-wheel having its tire and central portion formed in separate parts, said tire having the inner circumferential grooves $a$ $a'$ formed with inner and outer walls $a^4$ $a^5$, both outwardly inclined from the center of the tire, and said central portion consisting of two disks, which at the periphery thereof are inserted in the notches in said tire, substantially as set forth.

3. A car-wheel having its tire and central portion in separate parts, said central portion consisting of two disks, which at the periphery thereof are inserted in notches in the inner face of said tire, said notches each having the inner line $a^3$ thereof parallel with the central axis of the wheel, the inner side $a^4$ inclined outward and the outer side $a^5$ inclined outward, and said peripheral disk portions being fitted to said notches, substantially as described.

Witness my hand this 5th day of September, 1891.

HERMAN GUELS.

Witnesses:
C. D. MOODY,
A. BONVILLE.